United States Patent
Tsutsumi et al.

(10) Patent No.: US 7,608,647 B2
(45) Date of Patent: Oct. 27, 2009

(54) RESIN COMPOSITION, RESIN MOLDED ARTICLE AND PRODUCTION METHOD THEREOF

(75) Inventors: Daisuke Tsutsumi, Aichi-ken (JP); Koichiro Hayashi, Anjo (JP); Kenichi Yasunaga, Toyota (JP)

(73) Assignees: Toyoda Gosei Co., Ltd., Aichi-pref. (JP); Toyota Jidosha Kabushiki Kaisha, Aichi-ken (JP)

( * ) Notice: Subject to any disclaimer, the term of this patent is extended or adjusted under 35 U.S.C. 154(b) by 490 days.

(21) Appl. No.: 11/231,930

(22) Filed: Sep. 22, 2005

(65) Prior Publication Data

US 2006/0068141 A1    Mar. 30, 2006

(30) Foreign Application Priority Data

Sep. 30, 2004   (JP)   .............................. 2004-286264
Aug. 2, 2005    (JP)   .............................. 2005-224320

(51) Int. Cl.
    *C08K 7/00*   (2006.01)
(52) U.S. Cl. ........................ 523/220; 524/495; 524/496
(58) Field of Classification Search ................. 523/220; 524/495, 496
    See application file for complete search history.

(56) References Cited

U.S. PATENT DOCUMENTS

| | | | |
|---|---|---|---|
| 5,294,461 A | 3/1994 | Ishida et al. | |
| 5,310,600 A | 5/1994 | Tsuya et al. | |
| 5,750,220 A | 5/1998 | Barton et al. | |
| 2002/0052440 A1 | 5/2002 | Tochioka et al. | |
| 2005/0005890 A1* | 1/2005 | Asfaw et al. ........... | 123/184.61 |

FOREIGN PATENT DOCUMENTS

| | | |
|---|---|---|
| EP | 0 491 043 A1 | 6/1992 |
| EP | 1 116 571 A1 | 7/2001 |
| FR | 2 783 743 A1 | 3/2000 |
| JP | U-S62-20922 | 2/1987 |
| JP | A-63-237918 | 10/1988 |
| JP | A-H06-191296 | 7/1994 |
| JP | A-H06-340033 | 12/1994 |
| JP | A-H09-176443 | 7/1997 |
| JP | A-2002-226707 | 8/2002 |
| JP | A-2004-223744 | 8/2004 |
| WO | WO98/39387 | 9/1998 |

OTHER PUBLICATIONS

Office Communication issued from European Patent Office issued on Nov. 30, 2005 for the corresponding European patent application No. 05021105.1-2307.
Bowen, Steve T. and Johnson, Patrick H., "Long Fibre Reinforced Thermoplastics for the Injection Moulding Process." *Engineering Plastics* vol. 4(1991): p. 188-197.
Zippmann, V., "Injection Moulded Parts Made of Thermoplastics and Termosets with Long-Fire Reinforcement." *Engineering Plastics* vol. 4 (1991): p. 177-187.
Office Action dated May 16, 2008 in corresponding Chinese Patent Application No. 200510104816X.

* cited by examiner

*Primary Examiner*—Edward J Cain
(74) *Attorney, Agent, or Firm*—Posz Law Group, PLC (57) ABSTRACT

The present invention provides a resin composition and a resin molded article capable of designing to make specific properties, in particular, fuel barrier properties, consistent with impact resistance. The resin composition includes a mixture of a thermoplastic resin with fibers having lengths of from 4 to 20 mm. The fibers have melting points higher than a melting point of the thermoplastic resin or are infusible.

3 Claims, 6 Drawing Sheets

RESIN COMPOSITION, RESIN MOLDED ARTICLE AND PRODUCTION METHOD THEREOF

TECHNICAL FIELD

The present invention relates to a resin composition, a resin molded article and their production method. In particular, the invention is suitable for fuel system parts which are to be exposed to fuels, such as fuel tanks.

BACKGROUND OF THE INVENTION

A resin-made fuel tank for automobile includes a fuel tank as prepared by integral molding by blow molding and a fuel tank as prepared by welding split molded bodies which are half-split by injection molding each other in a welding portion. In any case, it is necessary to make fuel barrier resistance consistent with impact resistance.

(1) In a fuel tank as prepared by integral molding by blow molding, by using a parison of plural layers, it is possible to realize a structure of plural layers with ease. Accordingly, in Japanese laid-open patent publication numbers Hei6-340033 and Hei6-191296, there is studied a multilayered structure composed of a laminate of a base layer made of a high density polyethylene (HDPE) resin which is excellent in impact resistance but poor in fuel barrier properties and a barrier layer made of an ethylene-vinyl alcohol (EVOH) copolymer resin which is excellent in fuel barrier properties. However, fuel tanks as prepared by blow molding involved such problems that the productivity is inferior to that by injection molding; that the degree of freedom of shape is limited; and that in special sites such as a pinch portion where terminal ends are pinched and flattened by blow molding and fitting hole portions to be processed for fitting parts such as valves, the barrier layer becomes discontinuous so that permeation of a fuel is increased as compared with that in general sites.

(2) On the other hand, fuel tanks as prepared by welding split molded bodies which are half-split by injection molding each other in a welding portion have such advantages that the productivity is excellent as compared with that by blow molding and that even in special sites, permeation of a fuel does not so differ from that in general sites. However, according to the injection molding, since it is difficult to realize a structure of plural layers, it is important to employ an injection molding material having excellent fuel barrier properties and impact resistance in a single layer. Up to date, in Japanese Utility Model Application number 61-89188 (JP-UM-A-62-20922), nylon 6 and nylon 12 have been mainly studied as an injection molding material. However, there was encountered such a problem that permeation of a fuel containing an alcohol such as methanol and ethanol is large. In recent years, there is also studied, in Japanese laid-open patent publication number 2002-226707, a blend of a polyphenylene sulfide (PPS) resin which is excellent in fuel barrier properties but poor in impact resistance and an olefinic resin capable of increasing impact resistance. However, there was encountered such a problem that fluidity in injection molding is insufficient.

Figure 6:
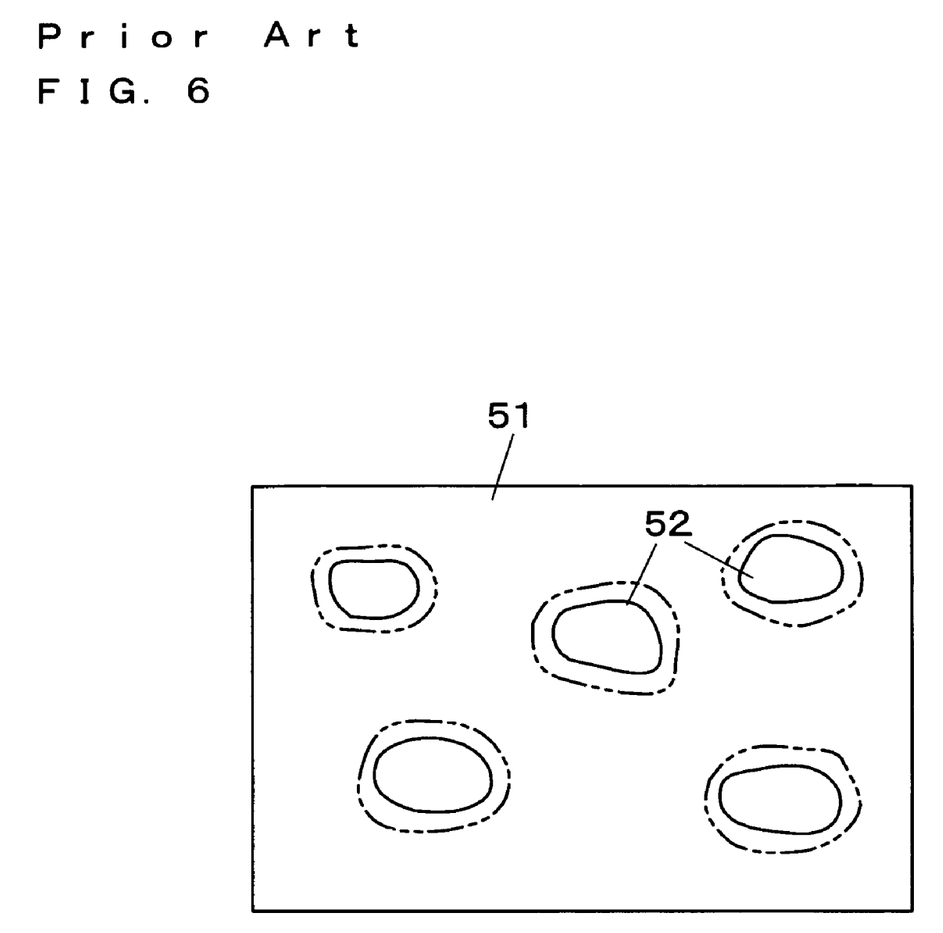
FIG. 6 is a schematic view of a resin composition of the related art.

Furthermore, in the blend of a PPS resin and an olefinic polymer, on a long-term basis, as shown by a change from a solid line to a two-dotted line in FIG. 6, there is some possibility that a fuel is stored in an olefinic polymer 52 in a PPS resin 51 and swollen, thereby causing a dimensional change. This is because it is general that the olefinic polymer is dissolved in or swollen by a fuel due to its poor fuel oil resistance.

SUMMARY OF THE INVENTION

An object of the invention is to solve the foregoing problems and to provide a resin composition and a resin molded article (in particular, a fuel system part) capable of designing to make specific properties (in particular, fuel barrier properties) consistent with impact resistance by enhancing impact resistance regarding thermoplastic resins which are excellent in specific properties (in particular, fuel barrier properties) but poor in impact resistance.

(1) A resin composition of the invention comprises a mixture of a thermoplastic resin with fibers having lengths of from 4 to 20 mm, the fibers having melting points higher than a melting point of the thermoplastic resin or being infusible.

(2) A resin molded article of the invention comprises a matrix of a thermoplastic resin having dispersed therein fibers having lengths of from 4 to 20 mm, the fiber having melting points higher than a melting point of the thermoplastic resin or being infusible.

(3) A production method of a resin molded article of the invention comprises: mixing a thermoplastic resin with fibers having lengths of from 4 to 20 mm, the fibers having melting points higher than a melting point of the thermoplastic resin or being infusible, and molding the mixture at a molding temperature which is higher than the melting point of the thermoplastic resin and lower than the melting points of the fibers.

a: Thermoplastic Resin

Though the thermoplastic resin is not particularly limited, preferred examples thereof include the following materials.

(1) When applied for molding of a fuel system part as described later, thermoplastic resins having high fuel barrier properties, specifically thermoplastic resins having a fuel permeability coefficient at 65° C. of not more than $1.0 \times 10^{-11}$ m$^3$·m/m$^2$/sec/MPa against a test fuel having a composition of toluene, isooctane and ethanol in a mixing volume ratio of 45/45/10 (hereinafter referred as "CE10") are preferable.

(2) Thermoplastic resins having excellent fuel oil resistance, specifically thermoplastic resins having a saturated swelling amount at 65° C. by CE10 of not more than 10% by weight are preferable.

(3) Thermoplastic resins having high fluidity, specifically thermoplastic resins having a melt flow rate (MFR) (load: 5,000 g), as measured according to ASTM-D1238, of 15 g/10 min or more are preferable.

(4) With respect to the kind, one kind (single material) or blends of two or more kinds selected from the group consisting of a polyacetal resin, a polyester resin, a ketone resin, a polyamide resin, and a fluorine based resin are preferable.

(5) Thermoplastic resins of the kind of the foregoing (4), which meet one or more of the foregoing requirements (1), (2) and (3) are more preferable, and some examples thereof are shown in Table 1.

TABLE 1

| Kind of material | Name of Material | Melting Point (° C.) | Fuel Permeability coefficient (m³·m/m²/sec/MPa) | Remarks |
|---|---|---|---|---|
| Polyacetal | homoPOM | 190 | $1.7 \times 10^{-12}$ | |
| | co-POM | 165 | $6.3 \times 10^{-12}$ | |
| Polyester | PBT | 220 | $1.4 \times 10^{-12}$ | PET is also employable |
| | PEN | | $4.9 \times 10^{-12}$ | |
| | PBN | | $4.7 \times 10^{-12}$ | |
| Keton Resin | aliphatic | | $5.5 \times 10^{-13}$ | |
| | PEEK | | $1.3 \times 10^{-13}$ | |
| Polyamide | PA11 | 185 | $6.0 \times 10^{-12}$ | Every PA is employable |
| | PA12 | 175 | $2.0 \times 10^{-12}$ | |
| | PA6 | 215 | $3.1 \times 10^{-12}$ | |
| | PA66 | 265 | $3.9 \times 10^{-13}$ | |
| | MXD6 | 240 | $1.2 \times 10^{-13}$ | |
| Fluorine base | ETFE | 200 | $6.0 \times 10^{-13}$ | Besides, PTFE, PVdF, FEP, PFA, etc |
| Others | EVOH | 190 | $6.6 \times 10^{-14}$ | |
| | PPS | 280 | $5.7 \times 10^{-14}$ | |
| | PEI | — | $8.9 \times 10^{-15}$ | |

Figure 3:
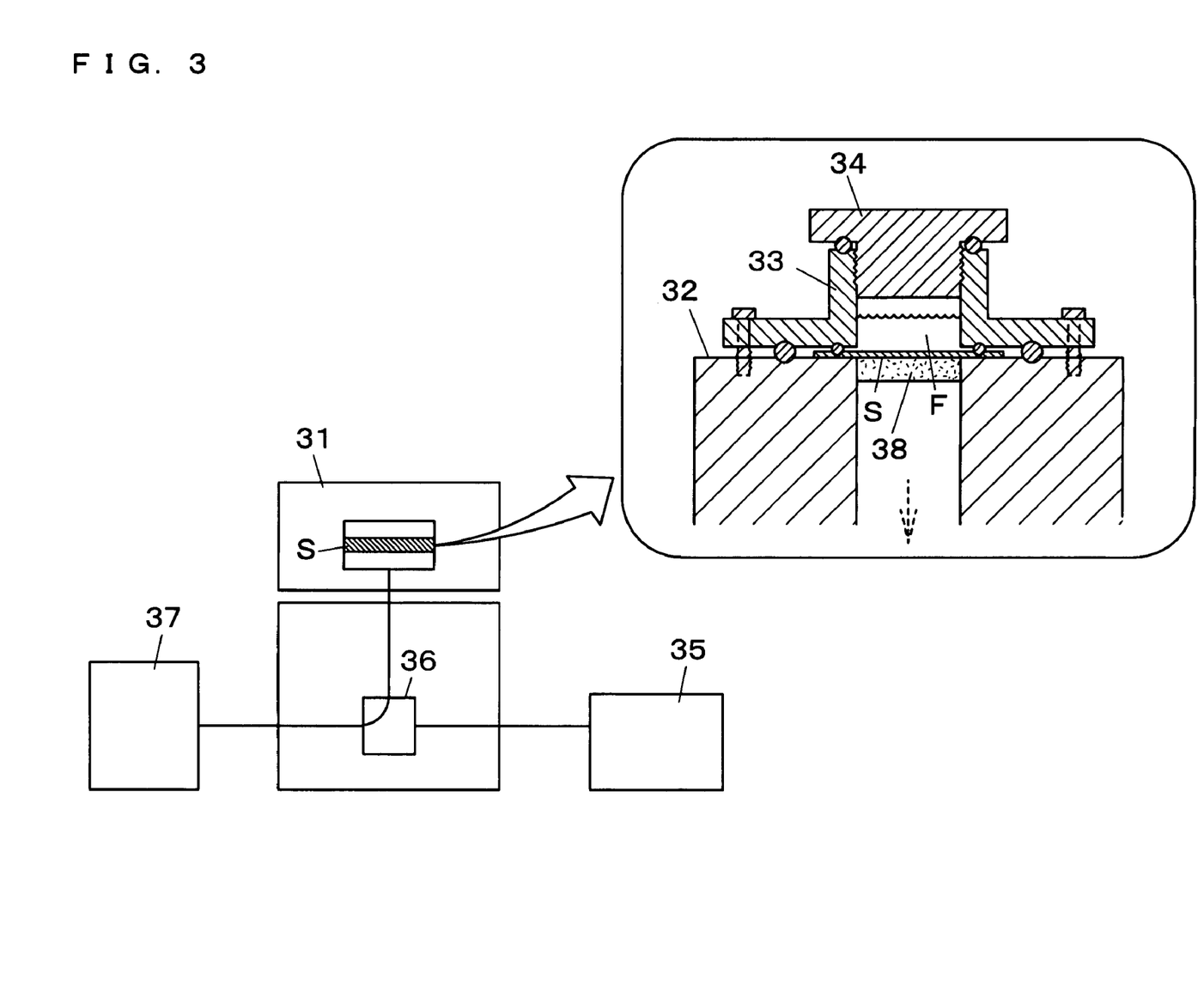
FIG. 3 is a schematic view to show a method for measuring an amount of a permeated fuel.

Incidentally, the fuel permeability coefficient in Table 1 was measured by using a commercially available differential gas permeability analysis system (Model GTR-30XVT, manufactured by GTR TEC Corp.). As illustrated in FIG. 3, a test film S was set on a sintered metal 38 of a specimen support 32 which was set under a fixed temperature within a thermostat 31 of the subject analysis system, and a liquid sealing jig 33 for pressing the surrounding of the test film S was bolted on the specimen support 32. Next, CE10 as a test fuel F was poured onto the test film S, and an upper lid 34 of the liquid sealing jig 33 was closed. In this way, the upper surface of the test film S was exposed to the test fuel F, the lower portion of the test film S was decompressed by a vacuum pump 35 and allowed to stand in this state under a fixed temperature, thereby making the test film S stationary. After making it stationary, the test fuel F which had permeated through the test film S per a fixed time was trapped via a metering tube 36 and poured in a gas chromatograph 37 to detect peaks from which was then subjected to qualitative analysis and quantitative analysis. The quantitative analysis was carried out in a manner that the respective component's in a defined amount of CE10 were previously poured in the gas chromatograph 37 to detect peaks from which was then obtained a calibration curve showing the relation between an amount of each of the components and a peak area, and peaks due to the foregoing permeation per a fixed time were applied to this calibration curve.

b. Fiber

As described previously, the fibers are fibers having lengths of from 4 to 20 mm and having melting points higher than the melting point of the thermoplastic resin or being infusible. The reason why fibers having melting points higher than the melting point of the thermoplastic resin or being infusible, is used resides in the purpose for keeping the fiber shape against the fusion of the thermoplastic resin. Furthermore, the reason why fibers having lengths of from 4 to 20 mm are used resides in the matter that when the fiber lengths are less than 4 mm, an effect for enhancing the impact resistance tends to be lowered, while they exceeds 20 mm, an appearance of a molded article tends to be lowered. It is preferable that the fiber lengths are from 6 to 10 mm. Besides, though the fibers are not particularly limited, preferred examples thereof include the following materials.

(1) Organic fibers or carbon fibers. Though other fibers (for example, glass fibers) can be employed, they may be excluded.

(2) With respect to the kind of the organic fibers, one kind (single material) or blends of two or more kinds selected from the group consisting of cellulose fibers, polyamide fibers, polyester fibers, polyvinyl alcohol based fibers, polyvinyl chloride based fibers, polyvinylidene chloride based fibers, polyolefin based fibers, polyurethane based fibers, polyalkylene para oxybenzoate fibers, and polytetrafluoroethylene fibers are preferable. Some examples thereof are shown with carbon fibers in Table 2.

TABLE 2

| Kind of Fibers | Name of Fibers | Melting Point (° C.) |
|---|---|---|
| Cellulose | Rayon | Infusible |
| | Cupra | Infusible |
| | Acetate | Infusible |
| Polyamide | Nylon 6 | 215 |
| | Nylon 66 | 265 |
| | Aramid (entirely aromatic) | Infusible |
| Polyester | PET | 245 |
| | PBT | 220 |
| Polyvinyl alcohol base | Vinylon | 230 |
| Polyvinyl chloride base | Vinyl chloride | 180 |
| Polyvinylidene chloride base | Vinylidene chloride | 212 |
| Polyolefin base | Polyethylene | 120 |
| | Polypropylene | 160 |
| Polyurethane base | Polyurethane | 100 |
| Polyalkylene para oxybenzoate base | Benzoate | Infusible |
| Others | Polytetrafluoroethylene | Infusible |
| | Polyphenylene sulfide | 285 |
| | Carbon | Infusible | c: Combination of Thermoplastic Resin with Fiber (1) Infusible fibers can be mixed with any thermoplastic resin.
(2) Thermally fusible fibers can be mixed with any thermoplastic resin having a higher melting point.
(3) As specific combinations, combinations of a thermoplastic resin in the left-hand column of Table 3 with fibers in the right-hand column of the same can be exemplified.

TABLE 3

| Resin | Fibers |
|---|---|
| PBT | PET, PA66, Vinylon, Cellulose, Fluorine base, Polyphenylene sulfide, Aramid, Carbon |
| POM | PET, PBT, PA6, PA66, Vinylon, Cellulose, Fluorine base, Polyphenylene sulfide, Aramid, Carbon |
| Nylon 6 | Rayon, Nylon 66, Aramid, Polyphenylene sulfide | d: Other Additives

In addition to the fibers, an additive can be added to the thermoplastic resin, and the following materials can be exemplified.

(1) Antioxidant
(2) Modifier:

Usual modifiers such as a coupling agent, a plasticizer, a crystal nucleating agent, a metallic soap, a releasing agent, a coloration preventing agent, a lubricant, an ultraviolet inhibitor, a coloring agent, a flame retarder, and a blowing agent can be blended.

(3) Filler e: Mixing Ratio of Resin Composition

With respect to a mixing ratio of the resin composition, it is preferable that the amounts of the fibers are from 5 to 50% by weight, with the remainder being the thermoplastic resin and other additives. When the amounts of the fibers are less than 5% by weight, an effect for enhancing the impact resistance tends to be lowered, while when the amounts of the fibers exceed 50% by weight, the molding processability (appearance and welding properties) tends to be lowered. It is more preferable that the amounts of the fibers are from 20 to 40% by weight.

f: Production Method of Resin Composition

Figure 1A:
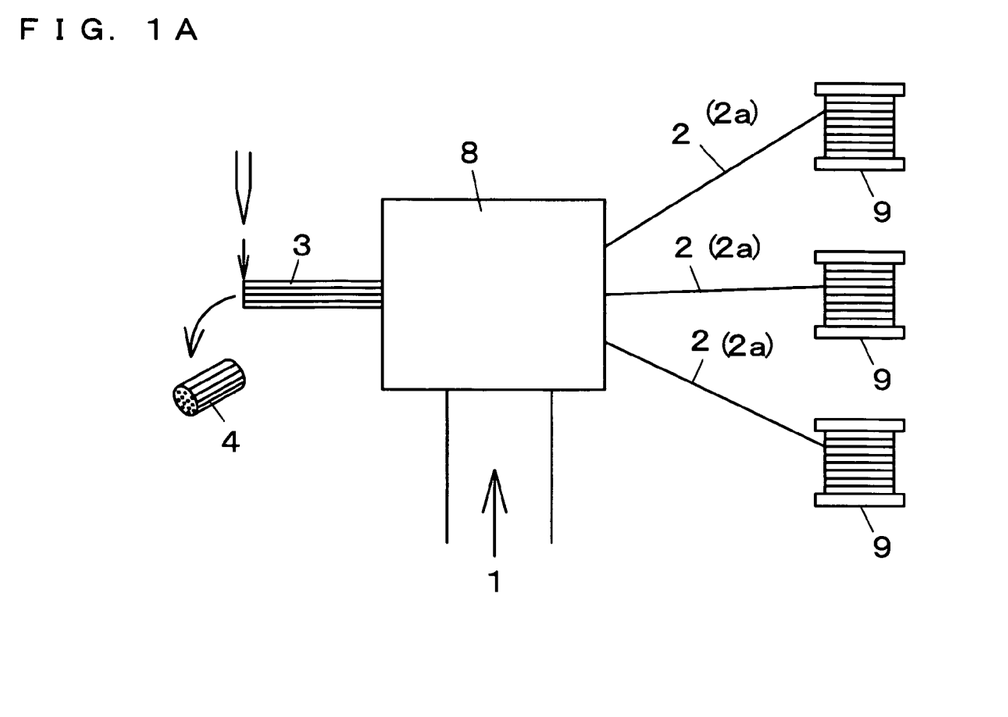
FIG. 1A is a schematic view to show the production method of a pellet.

Though the production method of the resin composition (mixing method of the thermoplastic resin with the fibers) is not particularly limited, the following exemplified method is preferable. As illustrated in FIG. 1A, a fused thermoplastic resin 1 is fed into a crosshead 8 installed in the tip of a resin extruder, and at the same time, a number of continuous fibers 2 are fed thereinto. The feed of the subject fibers 2 can be carried out by winding afiber strand (yarn) 2a made of a number of monofilaments around a bobbin 9 and delivering the plural fiber strands 2a from the subject bobbin 9 or other means. A longitudinal body 3 in the state that the collectively drawn plural fibers are coated with a thermoplastic resin, is extruded from the crosshead 8, and cut into a pellet 4 having a prescribed length (this length becomes a length of the fiber). As a result, a resin composition in a pellet form can be obtained. Furthermore, by fusing and mixing this pellet 4 by a kneader such as an injection molding machine, it is possible to obtain a resin composition in a fused form.

g: Dispersion State of Fiber

Figure 1B:
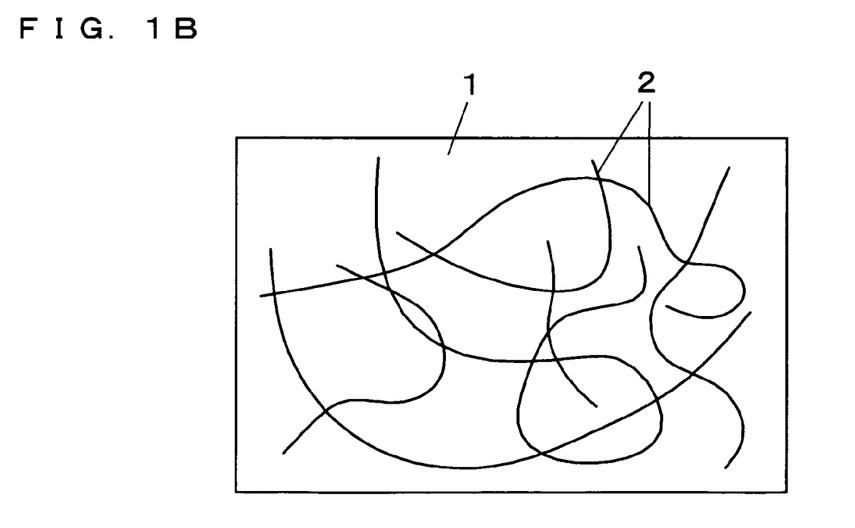
FIG. 1B is an enlarged view of a resin composition.

FIG. 1B is an enlarged view to schematically show a microstructure of a resin composition in a fused form or a resin molded article as molded therefrom and shows the state that the fibers 2 are separated and dispersed in a monofilament unit in a matrix of the thermoplastic resin 1 (a part of the monofilaments can be partially tangled with each other). Such a dispersion state is considered preferable. Since the fibers 2 have melting points higher than that of the thermoplastic resin 1 or are infusible, nevertheless fusion of the thermoplastic resin 1, the fibers 2 keep the fiber shapes. Furthermore, as described previously, when the fiber lengths of the fibers 2 are 4 mm or more, entanglement becomes increased as illustrated in FIG. 1B. If the fibers 2 are dispersed in this way, when an impact force is applied to a resin molded article, it is assumed that impact energy is absorbed due to friction between the matrix of the thermoplastic resin 1 and the fibers 2, whereby impact resistance becomes high. In particular, when the fibers 2 are long fibers having fiber lengths of from 4 to 20 mm, it is considered that the friction becomes increased and entanglement becomes also increased, whereby impact resistance becomes higher.

h: Resin Molded Article

A resin molded article is not limited to molded articles of a specific application but can be implemented to resin molded articles of a variety of applications such as automobile parts and interior articles, parts and cases of electrical or electronic devices, parts and cases of machineries, and main bodies and cases of indoor devices. Especially, by mixing fibers in a thermoplastic resin having excellent fuel barrier properties, it is possible to make fuel barrier properties consistent with impact resistance. Accordingly, the resin molded article can be suitably applied to fuel system parts which are to be exposed to a fuel. Examples of fuel system parts include a fuel tank, a valve, a fuel hose, a fuel hose joint, a fuel pump, a fuel pump housing, and a canister. The resin molded article is especially suitable for a fuel tank.

i: Molding Method

Though the molding method of the resin molded article is not particularly limited, for example,. fusion molding (injection molding, injection press molding, etc.), blow molding, extrusion molding, stamping molding, vacuum molding, pressure molding, slash molding, and compression molding can be exemplified. In particular, fusion molding is preferable for a fuel system part.

j: Molding Temperature

In the molding method of the resin molded article, as described above, the molding temperature is higher than the melting point of the foregoing thermoplastic resin and lower than the melting points of the foregoing fibers. It is preferable that the molding temperature is higher than the melting point of the foregoing thermoplastic resin by 10 to 50° C. and lower than the melting points of the foregoing fibers by 20 to 30° C. or more. This resides in the purpose for reliably preventing the fusion of the fibers from occurring.

According to the resin composition, the resin molded article, and their production method of the invention, with respect to a thermoplastic resin which is excellent in specific properties but poor in impact resistance, by enhancing its impact resistance, it is possible to design to make the specific properties consistent with the impact resistance. In particular, according to a resin composition and a fuel system part using a thermoplastic resin having excellent fuel barrier properties, with respect a thermoplastic resin which is excellent in fuel barrier properties but poor in impact resistance, by enhancing its impact resistance, it is possible to design to make the fuel barrier properties consistent with the impact resistance. Thus, it is possible to realize a fuel system part of a single layer as prepared by fusion molding (injection molding, injection press molding, etc.)

BRIEF DESCRIPTION OF DRAWINGS

FIGS. 1A and 1B show a resin composition of the invention, in which

DETAILED DESCRIPTION OF THE INVENTION

Figure 2A:
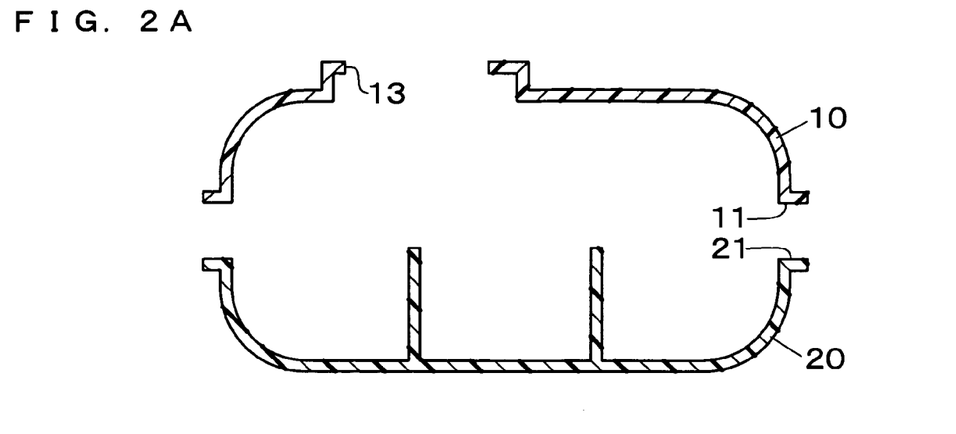
FIGS. 2A to 2C are cross-sectional views of a fuel tank according to an embodiment.
Figure 2B:
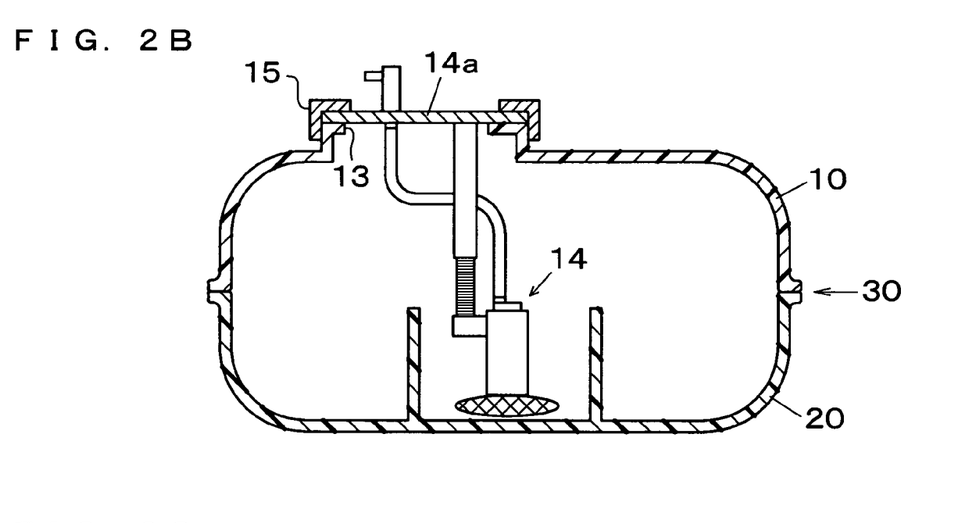
Figure 2C:
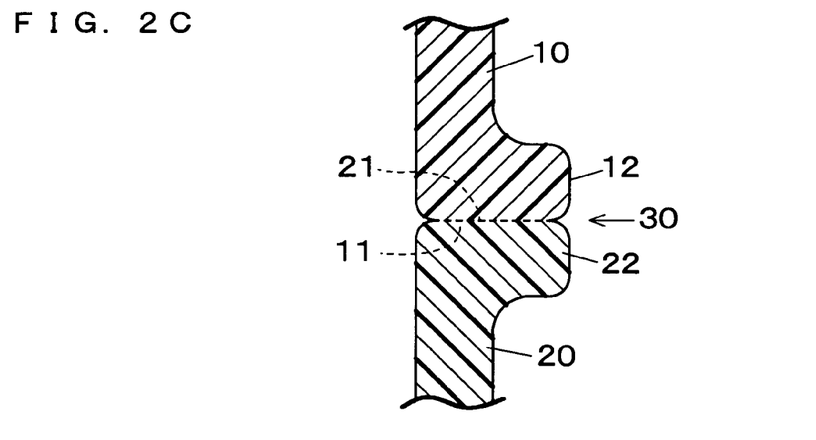

FIGS. 2A to 2C show a fuel tank as produced by using a resin composition comprising a mixture of a thermoplastic resin having high fuel barrier properties and fluidity with fibers which have melting points higher than that of the subject thermoplastic resin or are infusible. Microscopically, as illustrated in the foregoing FIG. 1B, the fibers are separated and dispersed in a monofilament unit in the matrix of the thermoplastic resin. This fuel tank is one as prepared by welding, as split molded bodies which are half-split by injection molding, an upper shell 10 and a lower shell 20 in a welding portion 30. The upper shell 10 is in an inverted closed-end cup form, the bottom face of which is opened, and the lower shell 20 is in a closed-end cup form, the top face of which is opened. General portions of the upper shell 10 and the lower shell 20 have a wall thickness of about 4 mm and an internal dimension of about 400 mm in width×about 600 mm in depth. A height from the bottom face opening to the internal top face of the upper shell 10 is about 150 mm, and a height from the top face opening to the internal bottom face of the lower shell is about 150 mm. The welding portion 30 is a site where a lower end face 11 of the upper shell 10 (accompanied with a flange 12 wherein a periphery is outwardly projected in the illustrated example) and an upper end face 21 of the lower shell 20 (accompanied with a flange 22 in the same manner) are butted. In the top face (general portion) of the upper shell 10, a fitting hole 13 is formed, and a fitting board 14a of a pump module 14 is patched in the subject fitting hole 13 and tightened by a lock ring 15 via a gasket (not illustrated).

This fuel tank is produced by the following step order.

(1) The foregoing resin composition is injected into a mold for upper shell to injection mold the upper shell 10 and is also injected into a mold for lower shell to injection mold the lower shell 20 at a molding temperature which is higher than the melting point of the foregoing thermoplastic resin and lower than the melting points of the foregoing fibers (FIG. 2A).

(2) The lower end face 11 of the upper shell 10 and the upper end face 21 of the lower shell 20 are butted by heating by a hot platen (hot plate welding), to form the welding portion 30 (FIGS. 2B and 2C).

(3) The fitting plate 14a of the pump module 14 is fitted in the fitting hole 13 of the upper shell 10 (the fitting hole 13 is formed at the time injection molding but may be formed by drilling after the subject molding) by the lock ring 15 (FIG. 2B).

According to the fuel tank of this embodiment, the following actions and effects can be obtained.

(A) Since the upper shell 10 and the lower shell 20 are injection molded by using the foregoing resin composition, the productivity is high. Furthermore, as described previously, since the thermoplastic resin having high fluidity is used, the molding properties are excellent, underfill is not caused, and impact property and tensile strength are secured.

(B) Since the upper shell 10 and the lower shell 20 are injection molded by using the thermoplastic resin having high fuel barrier properties (in particular, barrier properties against gasoline and alcohols), it is possible to inhibit the permeation of a fuel in a general portion. Furthermore, since a structure where the subject thermoplastic resins are fused each other in the welding portion 30 is taken, the fuel barrier properties of the welding portion 30 are equal to those in the general portion, and it is possible to inhibit the permeation of a fuel.

(C) Because of the matter that the fibers having lengths of from 4 to 20 mm are dispersed, the impact resistance is increased, and therefore, it is possible to obtain a fuel tank having excellent impact resistance.

EXAMPLES

As shown in following Table 4, a fuel tank as a resin molded article was molded from each of the resin compositions of Examples 1 to 8 and Comparative Examples 1 to 4, and each performance was measured and compared.

TABLE 4

| | Resin | Fiber 30% (fiber size 30 μm) | Molding temperature (° C.) | Fiber structure in molded article | −40° C. Izod impact strength (J/m) | Amount of Permeated fuel (g · mm/ m²/d) | Rate of dimensional change at the time of saturated swelling (%) |
|---|---|---|---|---|---|---|---|
| Example 1 | POM(homo type) | PET | 200 | ○ | 320 | 7.5 | 1.4 |
| Example 2 | POM(copoly type) | PET | 200 | ○ | 540 | 7.5 | 1.4 |
| Example 3 | Nylon 6 | Nylon 66 | 240 | ○ | 480 | 1.9 | 0.4 |
| Example 4 | POM(copoly type) | Nylon 66 | 200 | ○ | 520 | 7.0 | 1.3 |
| Example 5 | PBT | Nylon 66 | 240 | ○ | 440 | 2.5 | 0.4 |
| Example 6 | PBT | Aramid | 240 | ○ | 480 | 2.3 | 0.3 |
| Example 7 | Nylon 6 | Aramid | 240 | ○ | 500 | 1.7 | 0.3 |
| Example 8 | PPS | Aramid | 300 | ○ | 450 | 1.1 | 0.1 |
| Comparative Example 1 | POM(homo type) | — | 200 | — | 53 | 7.0 | 1.5 |
| Comparative Example 2 | PPS Epoxy-modified polyethylene Ethylene-α-olefin copolymer | — | 300 | — | 450 | 6.3 | 11.0 |
| Comparative Example 3 | PBT | PET | 250 | X | 30 | 2.5 | 0.5 |
| Comparative Example 4 | Nylon 6 | Nylon 66 | 260 | X | 20 | 1.8 | 0.4 |

Referring to Examples 1 and 2 as examples, details will be hereunder described. A pellet of a resin composition made of a mixture of a POM resin as a thermoplastic resin having high fuel barrier properties with 30% by weight of PET fibers having lengths of 6 mm as fibers was prepared according to a method as illustrated in the foregoing FIG. 1A. More specifically, the feed of the fibers as illustrated in FIG. 1A was carried out by delivering twelve fiber strands (yarn) 2a (1,670 dTEX) made of 192 monofilaments into the cross-head 8. This pellet was fused and mixed by a kneader of an injection molding machine (not illustrated), and the mixture was injected into molds to mold the foregoing upper shell and lower shell of a fuel tank. The molding temperature is about 200° C. which is higher than the melting point of POM and lower than the melting point of PET.

Example 3 is concerned with a resin composition comprising a mixture of a nylon 6 resin with nylon 66 fibers, and the molding temperature is about 240° C. which is higher than the melting point of nylon 6 and lower than the melting point of nylon 66.

Example 4 is concerned with a resin composition comprising a mixture of a POM resin with nylon 66 fibers, and the molding temperature is about 200° C. which is higher than the melting point of POM and lower than the melting point of nylon 66.

Example 5 is concerned with a resin composition comprising a mixture of a PBT resin with nylon 66 fibers, and the molding temperature is about 240° C. which is higher than the melting point of PBT and lower than the melting point of nylon 66.

Example 6 is concerned with a resin composition comprising a mixture of a PBT resin with aramid fibers, and the molding temperature is about 240° C. which is higher than the melting point of PBT and lower than the melting point of aramid.

Example 7 is concerned with a resin composition comprising a mixture of a nylon 6 resin with aramid fibers, and the molding temperature is about 240° C. which is higher than the melting point of nylon 6 and lower than the melting point of aramid.

Example 8 is concerned with a resin composition comprising a mixture of a PPS resin with aramid fibers, and the molding temperature is about 240° C. which is higher than the melting point of PPS and lower than the melting point of aramid.

Comparative Example 1 is concerned with a POM resin single body in which fibers were not mixed, and the molding temperature is 200° C.

Comparative Example 2 is concerned with a resin composition comprising a mixture of a PPS resin with, as an olefinic rubber, epoxy-modified polyethylene and an ethylene-α-olefin copolymer in a total amount of 30% by weight, and the molding temperature is 300° C.

Comparative Example 3 is concerned with a resin composition comprising a mixture of a PBT resin with PET fibers, and the molding temperature is about 250° C. which is higher than the melting point of PBT and also higher than the melting point of PET.

Comparative Example 4 is concerned with a resin composition comprising a mixture of a nylon 6 resin with nylon 66 fibers, and the molding temperature is about 260° C. which is higher than the melting point of nylon 6 and also higher than the melting point of nylon 66.

In Examples 3, 4 and 5 and Comparative Examples 2 and 3, the fiber lengths, the fiber amounts, the preparation method of a pellet, and the molding method of a shell are the same as Example 1. In Comparative Example 1, the molding method of a shell is the same as that in Example 1, too.

Furthermore, according to each of the resin compositions and molding temperatures of Examples 1 to 8 and Comparative Examples 1 to 4, a test piece for measuring an amount of a permeated fuel and a test piece for measuring an Izod impact strength were molded and measured for an amount of a permeated fuel and an Izod impact strength, respectively. Moreover, a rate of dimensional change at the time of saturated swelling against a fuel was measured. These measurement methods are as follows. The results of these measurements are shown in Table 4.

[Measurement of Izod Impact Strength]

The injection molded test piece was subjected to post processing to provide a notch, and a notched Izod impact strength was measured in a temperature atmosphere at −40° C. according to ASTM-D256.

[Measurement of Amount of Permeated Fuel (Cup Method)]

Figure 4:
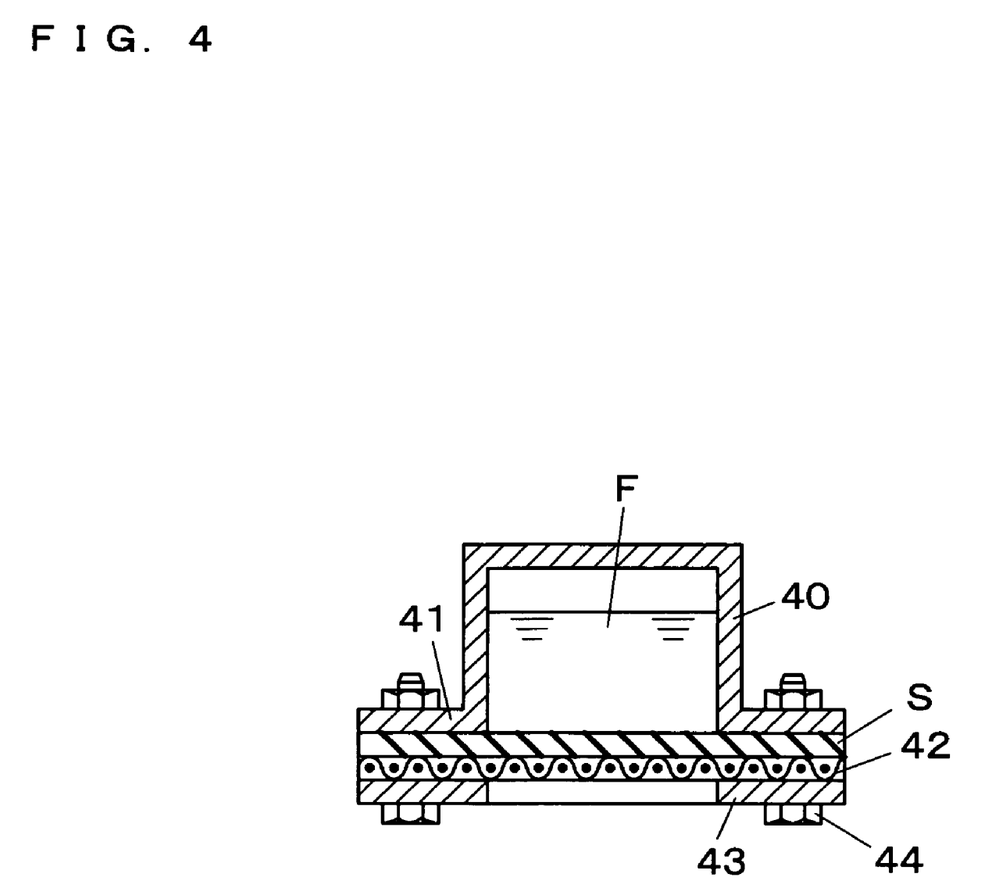
FIG. 4 is a schematic view to show another method for measuring an amount of a permeated fuel.

The cup method as referred to herein is a method in which, as illustrated in FIG. 4, 17 mL of a test fuel F is thrown into a flanged cup 40 (inner diameter: 34 mm, height in cup: 25 mm), a test piece S is placed on a flange 41, held by a press ring 43 via a wire net 42 and then set by bolts 44, this cup assembly is subsequently turned around, and an amount of the scattered test fuel F is measured with a lapse of time. CE10 was used as the test fuel F, and the measurement was carried out at 65° C. A numerical value is a value as reduced in terms of a thickness of 1 mm.

[Measurement of Rate of Dimensional Change at the Time of Saturated Swelling]

Before and after dipping in CE10 at 65° C. for 2,000 hours, a dimension in the width direction of the test piece (central portion of a multipurpose test piece type A as defined in ISO 3167) was measured, and a rate of dimensional change was determined.

As shown in Table 4, Comparative Example 1 is excellent in the fuel barrier properties but poor in the impact resistance, and Comparative Example 2 is large in the dimensional change due to saturated swelling. On the other hand, Examples 1 to 8 are excellent in all of the fuel barrier properties, the impact resistance and the resistance to saturated swelling. Furthermore, in Comparative Examples 3 and 4, nevertheless the fibers having melting points higher than that of the thermoplastic resin were mixed, since the injection molding was carried out at the molding temperature which is higher than the melting points of the fibers, results with poor impact resistance were brought. It is considered that when the fibers are once fused, they do not retain the shapes as fibers but are fused with the matrix, whereby an action for enhancing the impact resistance is not appeared.

Next, resin compositions were newly prepared by changing the PET fiber amounts of the resin composition (POM resin (copoly type)+PET fibers) of Example 2 to 20, 30 and 40% by weight, respectively and molded into test pieces for measurement at a molding temperature of about 200° C., and then measured for an Izod impact strength. The results of these measurements are shown in following Table 5.

Figure 5:
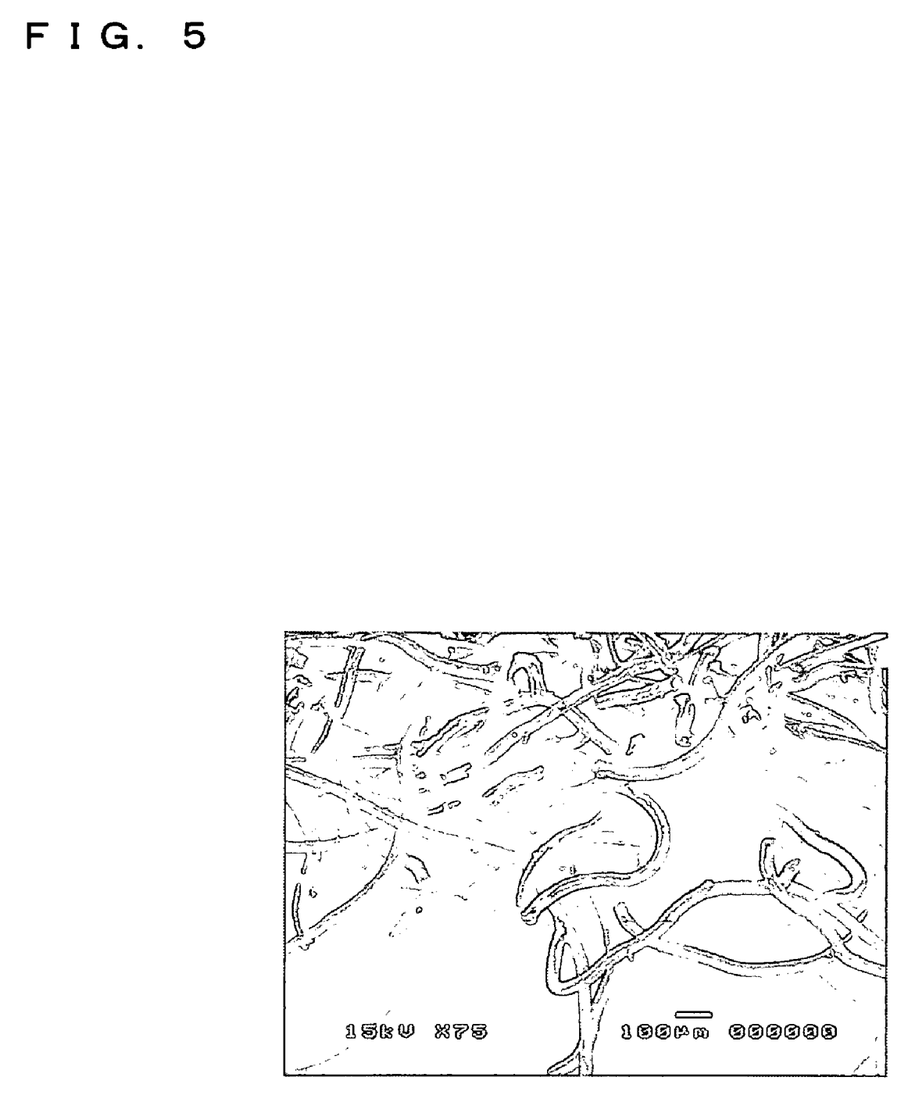
FIG. 5 is a microscopic photograph of the broken-out section of the test piece for measurement in the measurement of an Izod impact strength of Example 2.

A high impact strength was obtained in all of the cases of PET fiber amounts of from 20 to 40% by weight, and the highest impact strength was obtained in the case of 30% by weight. A microscopic photograph of the broken-out section of the test piece for measurement in the case of 30% by weight is shown in FIG. 5.

TABLE 5

| | Fiber amount (% by weight) | | |
| --- | --- | --- | --- |
| | 20 | 30 | 40 |
| −40° C. Izod impact strength (J/m) | 380 | 540 | 450 |

Next, resin compositions were newly prepared by changing the PET fiber lengths of the resin composition (POM resin (copoly type)+PET fibers) of Example 2 to 3, 6 and 9 mm, respectively and molded into test pieces for measurement at a molding temperature of about 200° C., and then measured for an Izod impact strength. The results of these measurements are shown in following Table 6. A high impact strength was obtained in all of the cases of PET fiber lengths of from 3 to 9 mm, and especially the high impact strength was obtained in the cases of 6 mm or more.

TABLE 6

|  | Fiber length (mm) | | |
| --- | --- | --- | --- |
|  | 3 | 6 | 9 |
| −40° C. Izod impact strength (J/m) | 250 | 540 | 530 |

Incidentally, the invention is not limited to the foregoing embodiment and examples, and changes and modifications can be properly made as described below so far as they do not exceed the gist of the invention.

(1) To form the upper shell 10 and the lower shell 20 by injection press molding.

(2) To form resin molded articles of a variety of applications other than the fuel tank by fusion molding by using the resin composition of the invention.

(3) To form resin molded articles having no welding portion by fusion molding by using the resin composition of the invention.

What is claimed is:

1. A resin molded article comprising a matrix of a thermoplastic resin having dispersed therein organic fibers having lengths of from 4 to 20 mm, wherein said organic fibers are one of fibers having melting points higher than a melting point of said thermoplastic resin, said resin molded article is a fuel system part that is to be exposed to a fuel, said thermoplastic resin is a co-POM resin, which is a kind of polyacetal resin, and said organic fibers are a polyethylene terephthalate (PET).

2. The resin molded article according to claim 1, wherein said thermoplastic resin has a fuel permeability coefficient at 65° C. of not more than $1.0 \times 10^{-11}$ m$^3$·m/m$^2$/MPa against a test fuel having a composition of toluene, isooctane and ethanol in a mixing volume ratio of 45/45/10.

3. The resin molded article according to claim 1, wherein said organic fibers have lengths of 6 to 10 mm.

* * * * *